United States Patent [19]

Karger et al.

[11] 4,207,541
[45] Jun. 10, 1980

[54] COOLING JACKET FOR LASER FLASH LAMPS

[75] Inventors: Arieh M. Karger, Binghampton, N.Y.; Elmer G. Fridrich, Chardon, Ohio

[73] Assignee: General Electric Company, Utica, N.Y.

[21] Appl. No.: 879,516

[22] Filed: Feb. 21, 1978

[51] Int. Cl.² ............................................. H01S 3/092
[52] U.S. Cl. .......................... 331/94.5 P; 331/94.5 D
[58] Field of Search ....................... 331/94.5 D, 94.5 P

[56] References Cited
U.S. PATENT DOCUMENTS

| | | | |
|---|---|---|---|
| 3,448,403 | 6/1969 | Vislocky | 331/94.5 P |
| 3,525,950 | 8/1970 | Chernoch | 331/94.5 P |
| 3,683,174 | 8/1972 | Fuchs | 331/94.5 P |
| 3,891,945 | 6/1975 | Schlossberg et al. | 331/94.5 P |
| 3,967,212 | 6/1976 | Dere et al. | 331/94.5 P |

Primary Examiner—William L. Sikes

[57] ABSTRACT

A cooling jacket for parallel triggered flash lamps, particularly useful in optically pumped lasers, is disclosed having an optically clear cylindrical outer envelope within which a glass-insulated trigger wire assembly is integrally formed. The high potentials required for reliable triggering of the flash lamp is substantially reduced by virtue of placing the trigger wire in close proximity to the cooled lamp, and the insulated trigger wire technique significantly increases the useful life of the associated components. The apparatus described is suitable for use with a range of coolant fluids and can accommodate a variety of flash lamps.

13 Claims, 4 Drawing Figures

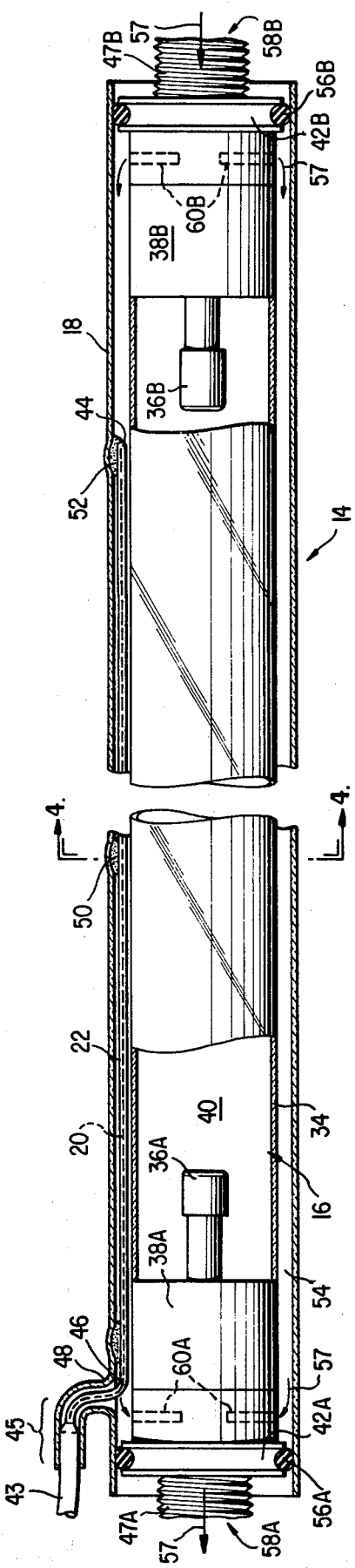
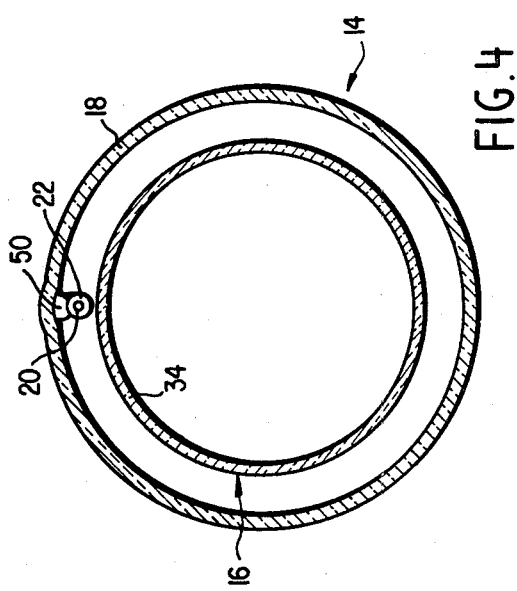
FIG.3
FIG.4

COOLING JACKET FOR LASER FLASH LAMPS

BACKGROUND OF THE INVENTION

1. Field of the Invention

This invention relates generally to lasers and more particularly to techniques for cooling and triggering of flash lamps used for optically pumped lasers. More specifically, the present invention relates to a cooling jacket apparatus having an integrally formed trigger wire assembly for parallel excitation of a flash lamp disposed within the jacket.

2. Description of the Prior Art

In the laser art, as progressively higher output powers are obtained, whether from pulsed or continuously running lasers, more and more stringent requirements are encountered for the thermal environment in which the laser device must operate. In its most basic form, control of the thermal environment of a laser device is exercised by cooling of the lasing medium by a flow of cooled gases or liquids over the materials per se, or over heat sinks which draw from the lasing materials. Recent advances in the field of solid state lasers using total internal reflection (TIR) within face pumped lasers (FPL) for development of the optical path for beam forming have added new dimensions to the thermal problems to be addressed. A part of the problem is due to the interaction of the cooling fluid with the total internal reflection within the laser material, alternately host material, resulting from the range of refractive indices of the fluid in which the laser is immersed. Another part of the problem is due to a reduction in laser output power because of thermally induced optical distortion in the laser materials. Clearly, the advance in performance of the newer laser devices will continue to depend on successfully resolving the thermal problems incurred.

A significant source of heat within the TIR-FPL, or in any optically pumped laser, is the flash lamps used for pumping of the host material. For an overview description of a TIR-FPL system, reference may be had to the publication "Total Internal Reflection Face Pumped Laser: Concept and Design Consideration" by G. J. Hulme and W. B. Jones, General Electric Company, Binghampton, N.Y., or to U.S. Pat. Nos. 3,679,999 of J. A. Chernoch; 3,581,229 of Martin; 3,500,231 of Tomiyasu and Almasi; 3,466,569 of Chernoch; and 3,423,693 of Chernoch and Koenig, all of which are assigned to the assignee of the present invention.

A representative prior art technique for cooling of laser devices and the flash lamps associated with them is provided in U.S. Pat. No. 3,679,999 to Chernoch, assigned to the assignee of the present invention. The Chernoch patent teaches the technique of removal of heat from solid state laser material via the combination of a gas layer in contact with a high thermal conductivity solid all of which is heat sinked by a cooling fluid.

Beyond the heat problems, operation of the flash lamps themselves has received attention due to their requirements for high voltages both to inititate and to maintain their light producing arc. Representative prior art teaching techinques for energizing these flash lamps—and especially the parallel triggered type—is provided in U.S. Pat. Nos. 4,010,397 to Hon and 4,047,064 to Cosco et al. Both patents address the problems associated with providing parallel triggering arrangements for flash lamps without reference to cooling considerations.

It is therefore a principal object of the present invention to overcome the disadvantages attendant in the prior art approaches, and to provide improved apparatus for cooling of optically pumped laser devises by exercising control over the thermal and optical environment of the flash lamp associated therein.

A further object of the present invention is to provide a cooling jacket of optical quality glass for surrounding a flash lamp such that coolant fluid may be flowed over the lamp to remove unwanted heat therefrom.

Another object of the present invention is to incorporate a trigger wire assembly within a cooling jacket such that the assembly becomes an integral part of the jacket and the combination may be used with a variety of flash lamp types and sizes.

Another object of the present invention is to provide a trigger wire electrode totally embedded in glass such that the trigger wire assembly positioned within the aforementioned cooling jacket is isolated from and thus precludes direct electrical contact of the trigger wire with the coolant medium. This arrangement increases the useful life of the components by eliminating harmful electrochemical processes otherwise resulting from electrical contact of the trigger element with the coolant.

Another object of the present invention is to decrease the size and weight of the power supplies required for parallel triggering of flash lamps by positioning of the trigger wire as close as feasible to its associated lamp, while retaining the thermal advantages resulting from immersing the flash lamp in coolant.

SUMMARY OF THE INVENTION

The above and other objects of the present invention are accomplished by providing a cooling jacket for laser flash lamps which addresses both thermal requirements and high voltage trigger wire considerations in one unique device. In an illustrative embodiment, the cooling jacket device comprises a cylindrical glass outer envelope for housing the flash lamp within a cooling fluid flow and includes a glass insulated trigger wire assembly, also within the glass jacket, for parallel triggering of the lamp. The cooling jacket incorporates structure for directing the flow of coolant within the jacket; for conducting the glass insulated trigger wire into the coolant chamber; for retaining a variety of flash lamps within the coolant chamber; and for optimally transmitting the lamp produced light to the laser device.

BRIEF DESCRIPTION OF THE DRAWINGS

These and other features of the present invention will be readily apparent from the following description when taken with the accompanying drawings wherein

FIG. 3 is a side elevation, partially fragmented, of a cooling jacket having a parallel triggering wire assembly according to the instant invention; and FIG. 4 is a cross-sectional view of the cooling jacket assembly.

DETAILED DESCRIPTION OF THE PREFERRED EMBODIMENT

Figure 2:
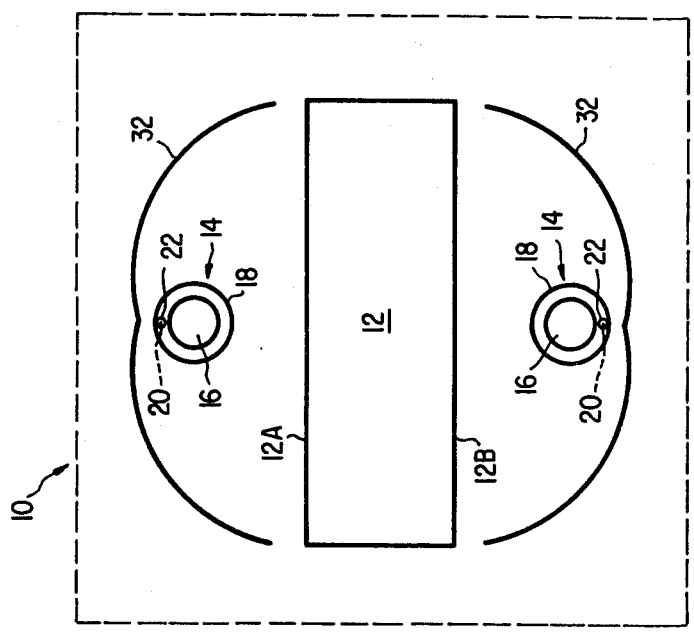
FIG. 2 is a cross sectional view of the face pumped laser particularly showing the flash lamp reflecting cavities.
Figure 1:
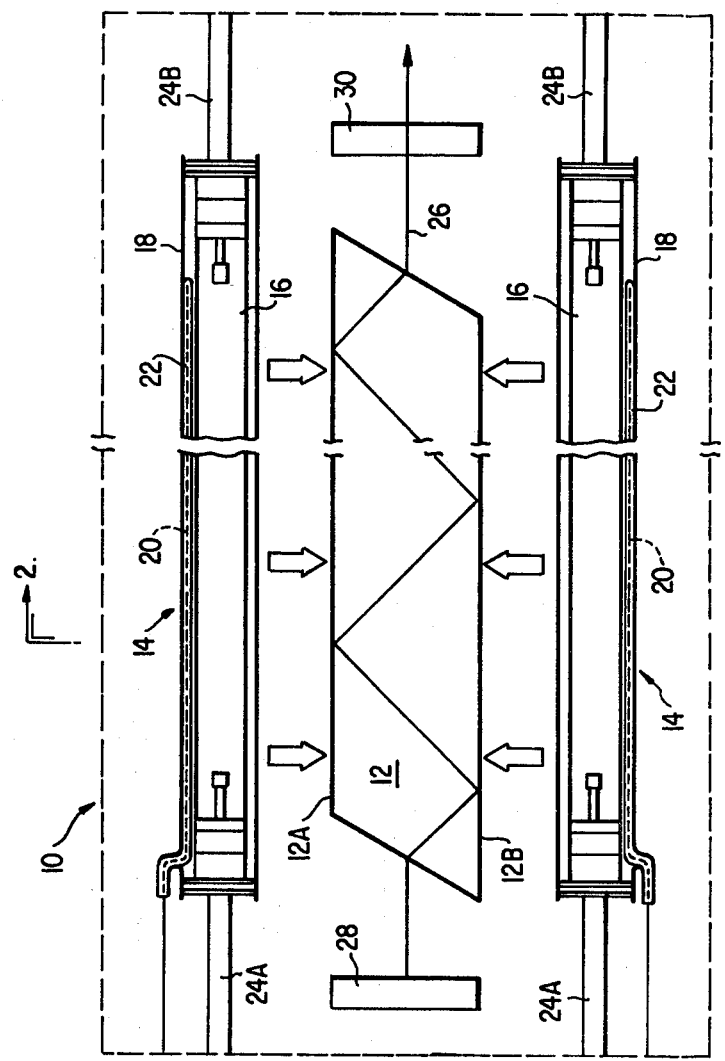
FIG. 1 is a schematic representation of a face pumped laser in which a pair of the cooling jackets assemblies for parallel triggered flash lamps of the instant invention are utilized.

Referring now to FIGS. 1 and 2 there is shown in highly schematic form a side view and a cross section view, respectively, of a total internal reflection (TIR) face pumped laser (FPL) system 10, in which the improved parallel triggering, cooling jacket assembly of the instant invention may be embodied. For clarity of presentation, the drawings are not to scale, and the TIR-FPL components well known to those having ordinary skill in the art and not necessary to a full understanding of the present invention have been omitted.

Briefly, a block of laser material 12 is shown as being optically pumped along its reflecting faces 12A and 12B by a pair of pump lamp assemblies 14. The pump lamp assemblies 14 are comprised of a pumping lamp 16, a glass outer cooling jacket 18, a trigger electrode 20 which is housed in a trigger tube 22, and a pair of coolant input/output conduits 24A and 24B. The laser host material 12 may be of the neodymium doped glass, or neodymium doped Yttrium-Aluminum-Garnet (YAG) types, and the TIR-FPL system 10 may be configured to produce a pulsed output beam along a path 26 by multiple total internal reflections at the relfecting faces 12A and 12B, between a retroreflector 28 and an output beam collimator 30. It should be noted, however, that the laser system outlined herein is set forth as an illustrative embodiment in which the present invention finds a useful application and should not be considered in any limiting sense as the parallel triggering cooling jacket assembly may obviously be used in a wide range of applications where its optical, thermal, electrical and mechanical advantages would be beneficial and could be advantageously applied.

Surrounding each pump lamp assembly 14 is a cavity reflector 32 (shown only in FIG. 2) which extends along the length of assembly 14 and directs the emitted light from pumping lamps 16 into the reflecting faces 12A and 12B of laser slab 12. The cavity reflectors 32 assure that substantially all of the light output from the pumping lamps 16 reaches the laser slab 12, and is further applied to achieve uniform pumping of the host material along the faces 12A and 12B.

Referring now to FIG. 3 there is shown a side elevation (not to scale) of an illustrative embodiment of a pump lamp assembly 14, hereinafter referred to alternately as parallel triggering cooling jacket assembly, wherein details of the parallel triggering technique and cooling jacket arrangement according to the instant invention are clearly depicted.

The pumping lamp 16 may be a conventional xenon lamp having a cylindrical glass envelope 34, metal electrodes 36A and 36B, and metallic end members 38A and 38B, within which a volume 40 of suitable gases are enclosed. As is well known, initiating the gaseous discharge within the lamp, which in the illustrative embodiment produces the pumping light of the desired spectral content and intensity, may be accomplished by means of an externally positioned trigger wire. This is known as shunt, or parallel, triggering and is characterized by providing the required higher initiating potential via electrodes other than the sustaining electrodes. The trigger electrode 20 is positioned axially in close proximity along the length of the lamp and has applied to it the several kilovolt (in the order of 13KV to 16KV) potential required to provide the intense electrostatic field of predetermined duration needed to provide initial ionization of the enclosed gasses. Subsequent maintenance of the arc within the lamp volume 40 is accomplished by application of sustaining potentials across the electrodes 36A-36B in the order of 2 KV to 2.5 KV.

The pumping lamp 16, hereinafter referred to alternately as flash lamp, is positioned within the cooling jacket 18 so as to be symmetrically concentric therein, and is maintained in position by means of end wall pieces 42A and 42B. The cooling jacket 18 is formed from thin walled cylindrical glass tubing of optical quality having an inner diameter slightly larger than the outer diameter of the associated flash lamp, and having length sufficient to accommodate the flash lamp 16 as well as end wall pieces 42A and 42B. The trigger tube 22 is positioned in the space between the cooling jacket 18 inner surface and the outer surface of the lamp envelope 34 and is affixed to the cooling jacket 18 as detailed below.

The trigger tube 22 may be formed from glass tubing having an outer diameter of, illustratively, 0.065", an inner diameter of 0.012" and is of sufficient length to extend substantially along the full length of the associated flash lamp. Within the trigger tube 22 is the trigger electrode 20, which may simply be a length of conductive material such as tungsten or platinum wire, or which may take the form of a narrow tungsten wire around which a quantity of indium is used to backfill the interior volume within the trigger tube 22. In any event it is important that the trigger electrode 20 be electrically insulated throughout its length and isolated from the interior volume of the cooling jacket 18, which volume will contain the coolant fluid for carrying away the heat developed during operation of the flash lamp 16. It is also desireable that the trigger electrode 20 be positioned as close to the flash lamp 16 as feasible in order to minimize the required arc initiating high voltage.

Electrical connection is made to the trigger electrode 20 by a section of insulated high voltage wire 43 having an insulation outer diameter such that it provides an interference fit with the inner diameter of an extension of the trigger tube 22 in a region 45. After a sound electrical contact is made between the inner conductor of the high voltage wire 43 and the trigger electrode 20, the trigger tube 22 is hermetically sealed in the region 45 to the insulation of the high voltage wire to produce a mechanically rigid attachment.

During fabrication, a first end 44 of the trigger tube 22 is heat sealed and a bend is made at the other end of the trigger tube 22 in a region designated 46. This bend preferably is substantially at a right angle to the axis of the trigger tube 22. The bent section is passed through a bubble blown in an end region 48 of the coolant jacket 18. The mating surfaces are heat sealed in the end region 48 so as to both close the coolant jacket 18, and to provide a glass enclosed chamber within the jacket in the form of the interior volume of the trigger tube 22. One or more additional heat joined regions 50 and 52 are placed along the length of trigger tube 22 to assure a strong mechanical support to the inside wall of the coolant jacket 18 and to resist and damp vibrations. The end wall pieces 42A and 42B provide mechanical attachments for the lamp end members 38A and 38B and are formed so as to produce an enclosed coolant chamber 54 within the coolant jacket 18 by virtue of the O-ring end seals 56A and 56B. The interior of end wall pieces 42A and 42B are chambered to permit the free flow of coolant fluid via the inlet/outlet ports 58A and 58B, designated by the flow arrows 57, through the plurality of inlet/outlet slots 60A and 60B to a heat exchanger (not shown).

End wall pieces 42A and 42B include threaded stems 47A, 47B, respectively, each of which has threaded thereon a pair of nuts (not shown) which serve to aid in insertion and withdrawal of the flash lamp 16 within the cooling jacket 18. Stems 47A and 47B are counter bored and in communication with ports 60A, 60B to permit a continuous flow of coolant to be maintained through the cooling jacket 18.

In operation, the parallel triggering cooling jacket assembly 14 is mated with an appropriate flash lamp 16. A trigger electrode potential is applied from a suitable high voltage source (not shown) via the high voltage wire 43. A supply and return of fluid coolant is routed via the inlet/outlet ports 58A and 58B to provide a controlled thermal environment for the flash lamp 16. Of particular benefit is the provision of an integral assembly wherein the lamp triggering electrode is housed within the coolant chamber volume in close proximity to its associated lamp, but is completely electrically isolated from contact with any portion of the lamp structure or with the fluid coolant by virtue of the sealed glass tubing in which it is enclosed. Among the benefits derived from this configuration are:

a. A reduction in the high voltage required for flash lamp ionization due to being able to place the trigger electrode within the coolant jacket and hence substantially closer to the flash lamp;

b. Elimination of the harmful electrochemical effects which occur if the trigger electrode is allowed to directly contact the coolant—such as the creation of internal pressures due to the generation of hydrogen gases;

c. Minimizing the possibility of high voltage arc overs between the trigger electrode and other elements in the assembly at or near ground potential; and d. The broad applicability of the trigger/coolant technique to a wide range of high heat producing flash lamp types and laser pumping lamp applications.

Although the invention has been described in terms of selected preferred embodiments, the invention should not be deemed limited thereto, since other embodiments and modifications will readily occur to one skilled in the art. It is therefore to be understood that the appended claims are intended to cover all such modifications as fall within the true spirit and scope of the invention.

We claim:

1. Apparatus for cooling of a flash lamp in an optically pumped laser; comprising:
   a. an elongated hollow cylindrical coolant jacket having a sealable opening proximate one end thereof;
   b. an electrically nonconductive hollow trigger wire assembly having an elongated electrically conductive element therein, said assembly being axially positioned along an inner surface of said coolant jacket and having one end routed through said sealable opening;
   c. a pair of end wall members disposed at the ends of said coolant jacket for forming a closed coolant chamber therefrom;
   d. inlet/outlet means coupled to said coolant jacket for enabling a flow of coolant fluid to pass through said coolant chamber; and
   e. means coupled to said coolant jacket for retaining said flash lamp within said coolant jacket.

2. The apparatus as set forth in claim 1 wherein said retaining means includes means for maintaining said flash lamp in substantially concentric alignment with said coolant jacket.

3. The apparatus as set forth in claim 1 or 2 wherein said end wall members further comprise O-ring members for closing said coolant jacket ends.

4. The apparatus as set forth in claim 2 wherein said retaining means further comprise electrical conductor means for applying operating voltages to said flash lamp.

5. The apparatus as set forth in claim 1 wherein said hollow trigger wire assembly comprises a length of small diameter glass tubing.

6. The apparatus as set forth in claim 1 wherein said electrically conductive element comprises a tungsten wire.

7. The apparatus as set forth in claim 5 wherein said electrically conductive element comprises a coating of said element on the interior surface of said glass tubing.

8. The apparatus as recited in claim 1, 5, 6 or 7 wherein said coolant jacket comprises a thin optically transparent glass through which light energy from said flash lamp can be efficiently transmitted to said laser.

9. Apparatus for triggering and cooling a self-contained lamp comprising:
   a. a lamp;
   b. a tubular glass enclosure jacket means having inner and outer wall surfaces and open ends for forming a coolant chamber around the lamp, said enclosure jacket being of optically transparent glass material through which light energy from said lamp can be efficiently transmitted to said laser;
   c. a trigger electrode disposed within said jacket means and affixed to an inner wall surface thereof and means within said jacket for isolating said trigger electrode from coolant within the chamber;
   d. inlet/outlet means coupled to opposite ends of said jacket means for retaining said lamp within said jacket means and for applying operating voltages to said lamp;
   e. said inlet/outlet means having a through passage for allowing a flow of coolant fluid through said coolant chamber; and including a pair of end wall members disposed at the open ends of said jacket means for substantially closing said coolant chamber.

10. The apparatus as set forth in claim 9 wherein said end wall members further comprise O-ring members for sealing said jacket means.

11. The device as set forth in claim 10 wherein said coolant chamber is disposed in substantially concentric relation with said lamp.

12. The device as set forth in claim 9 wherein said retaining means further comprise electrical conductor means for applying operating voltages to said lamp.

13. The device as set forth in claim 9 wherein said trigger electrode means comprises an elongated electrically conductive member disposed within a length of small diameter glass tubing forming said isolating means.

* * * * *